June 22, 1965

J. A. BRADNER 3,190,180

SELECTIVE GEARING ARRANGEMENT FOR HOBBING
GEARS AND MILLING THREADS

Filed Nov. 14, 1963

INVENTOR.
JOHN A. BRADNER
BY

United States Patent Office 3,190,180
Patented June 22, 1965

3,190,180
**SELECTIVE GEARING ARRANGEMENT FOR HOB-
BING GEARS AND MILLING THREADS**
John A. Bradner, Cleveland, Ohio, assignor to The Lees-
Bradner Company, Cleveland, Ohio, a corporation of
Ohio
Filed Nov. 14, 1963, Ser. No. 323,832
4 Claims. (Cl. 90—4)

This invention relates to machine tools and more particularly to a gearing system which may be selectively utilized in and forming a part of a single machine capable of performing a plurality of basically dissimilar machining operations on selected workpieces, such, for instance, as gear and spline hobbing operations and thread milling operations, where the maintenance of a proper timed relationship between the rotation of the lead screw driven by suitable lead gearing, and the movement of the workpiece, is essential.

The two arts of hobbing and thread milling are well known and those skilled in these arts are familiar with means developed to hob gears and splines in the one art and, in the other art, other means to mill threads, as represented by U.S. Letters Patent 2,563,982, Hobbing Machine, and U.S. Letters Patent 1,156,237, Thread Milling Machine, respectively.

It has been recognized in the past that very real economies would result if a single machine could be devised which would be capable of both hobbing gears and splines and of milling threads. Attempts in the past to combine these two techniques have failed, primarily for two reasons, the first being the fact that previous hobbing machines, when put to work thread milling, would lose lead relationship established during a first or trial cut, after quick returning, precluding satisfactory gauging to establish size, and resulting in excessive scrapping of specially prepared components, whereas thread milling machines, when put to work hobbing gears or splines, though capable of hobbing, again lose helical gear lead relationship after a cut and during quick return, again precluding the possibility of gauging and the taking of subsequent cuts to establish size.

In addition, in the art of hobbing, the rotation of the cutter or hob must be synchronized exactly with the rotation of the workpiece whereas, in the art of thread milling, it has been recognized that means must be provided whereby the speed of rotation of the cutter and the speed of rotation of the workpiece can vary independently.

For example, the thread milling machine disclosed in U.S. Patent No. 1,156,237 did not possess these independent drive means, a failing that was discovered and corrected in the later thread milling machine, U.S. Patent No. 2,405,522, wherein the common backshaft drive of the earlier thread milling machine was replaced by a dual motor drive in the latter tool, one motor and variable speed drive means was provided to operate the thread miller's cutter head, and a second independent motor and its variable speed drive mechanism was provided to operate the thread miller's workhead.

This second workhead drive means in a thread miller must be capable of two separate functions, first, slow rotation rates for feed purposes, whereby the required relative axial feed motion between the workpiece and thread milling cutter will be produced so that threaded sections of the required lead or pitch will be generated by feeding the workpiece past the cutter or feeding the cutter past the workpiece in proper timed lead relationship. It will immediately be apparent to those skilled in the art that although the relative axial motions of the workpiece and cutter parallel to the axis of the workpiece must be synchronized precisely to generate threaded sections of the required pitch or lead, the relative rates of actual rotation of the workpiece feeding and the cutter, milling, are completely independent of each other, the precise converse of the conditions prevailing when gears are being hobbed.

The other function that the workhead drive mechanism of the thread miller must create is that of quick return without losing timed relationship established during the first cut, for gauging purposes and the establishment of the desired final depth of cut to the size desired.

It will be observed on further study of these two last mentioned patents that what is achieved in the normal thread milling machine workhead is feed means through a feed clutch, reduction gearing, and suitable feed gearing to cause the workpiece to rotate at a suitable feed rate past the thread milling cutter which has been caused to rotate at a suitable cutting speed, in association with a lead screw driven by suitable lead gearing to cause the screw to rotate in the proper timed relationship with the workpiece so that the required relative axial translation of the workpiece and cutter will transpire and the desired lead or pitch of the threaded section to be produced will be generated, and a manually operable rapid traverse means, whereby on manual disengagement of the feed clutch and subsequent manual engagement thereafter of the rapid traverse friction clutch, the entire workhead mechanism comprising the feed gearing, the work spindle and workpiece, the lead gearing and thence the lead screw will be caused to spin at a very much higher rate, in a sense or direction opposite to the direction of the feed, achieving rapid return.

Upon review of this functioning it will be further observed that, by way of these two means, the relationship between the cutter and the threaded section generated during the first cut is maintained and is not lost during rapid return, thereby enabling the necessary gauging or measuring and the taking of a second or more cuts till the desired size or depth of threaded section to be produced is achieved.

To those skilled in the art, it will immediately be apparent that, in the case of a thread milling machine such as the mechanism disclosed in U.S. Patent No. 1,156,237, because of the fact that this is a thread milling machine in which the cutter head and the workhead are powered by a common source, the backshaft, that thereby the cutter and the work might, if desired, be caused to rotate in the proper timed relationship by the proper choice of feed gears and lead gears, thereby enabling the use of this thread miller for the hobbing of gears by the usage of this properly selected gearing and the substitution of a suitable hob replacing the normal thread milling cutter with which the thread miller would normally be arranged.

However, to those skilled in the art, it will immediately be apparent that two factors mitigate against the satisfactory usage of a thread miller such as this if gears are to be hobbed. In the first place the gearing calculations, if gears are to be hobbed, are extremely cumbersome and laborious, and secondly, if helical gears are to be produced, although the thread miller will maintain lead when operated as a thread miller, lead relationship between the hob and the gear when hobbing is not maintained but is lost if an attempt is made to employ the thread miller as a helical gear hobbing machine, precluding the possibility of gauging when size is being established when either the machine is first being set up or when changing cutters, i.e., hobs.

In a review of the hobbing process and the kinematics that enable the required timed rotation of the hob and the workpiece, the gear blank, the required relative feeding motion, and in the case of a helical gear, the addition of the required supplementary element of angular rotation of the workpiece in timed relationship with the rotation of the lead or feed screws, to create the desired amount of skew or helical advance of the workpiece, the helical gear being produced, it will be observed in the case of a hobbing machine, such as the mechanism described in Patent No. 2,563,982, there are certain basic elements required to achieve the necessary relationships.

Whereas in the case of the thread milling machine's workhead, it will be recalled there was required a pair of clutches to impart a relatively lower rate of operation or rotation of the workhead mechanism to achieve a suitable feeding rate and alternatively a relatively very much higher rate for rapid return, suitable feed gearing, means to drive the workpiece, the work spindle, and finally suitable lead gearing in correct association with the thread miller's lead screw to generate the desired pitch or lead of the component to be threaded, the screw thereby caused to rotate in proper timed relationship with the work spindle, i.e. the workpiece, the kinematics of the hobbing machine, e.g. Patent No. 2,563,982, seem to vary markedly.

In the art of generating toothed sections via the hobbing process, unlike the thread milling art, the cutter (the hob) must be rotated in precise timed relationship with the rotation of the workpiece, and, in the case of the generation of helical sections, not only must the rotation of the hob be in precise timed relationship with the rotation of the workpiece but, in addition, for the creation of the helical advance or skew of the component being generated, there must also be a supplementary equally precise timed relation between the supplementary angular advance of the workpiece and the rotation of the skew.

To those skilled in the art, the kinematics of the gear hobbing machine, e.g. Patent No. 2,563,982, are well known. Power to drive the machine is supplied from some fixed or variable mechanism such as a motor driving a common backshaft, causing the cutting tool, i.e. the hob, to rotate at a suitable cutting speed. Said backshaft also drives the workhead of the hobbing machine. In the case of a dual differential mechanism, such as is disclosed in U.S. Patent No. 2,563,982, said drive is brought through the internal components of the lead differential mechanism, differential L, to suitable index change gears $A/B/C$ of the required ratio to cause the work spindle and the workpiece to rotate at the proper timed rotation rate with the hobbing spindle and hob that the required number of teeth will be generated by the cutting tool or hob.

Said rotation of the work spindle can also be employed to cause the lead screw of the machine to rotate at a proper feeding rate via the choice and selection of suitable feed change gears, $D/E/F$, driving through the internal components of the rapid traverse differential mechanism, differential T, (said differential's case is stopped from rotation during feeding by some means such as a mechanical brake) to the lead screw. To those skilled in the art, the wisdom of this series type of dual differential installation will be immediately apparent.

And to those skilled in the art, it will also be immediately apparent that this means of drive to the traverse screw of the hobbing machine, the lead screw, can also be employed as a means of especially satisfactory moment to obtain the required supplementary element of angular displacement of the workpiece to create helical or skewed workpiece sections, for in the case of reductions to practice such as Patent No. 2,563,982, the rotation of the machine's lead screw drive mechanism can also be employed through suitable lead change gears $J/H/G$ to cause the lead differential mechanism's case to advance the proper amount to cause the work spindle of the machine and thence the workpiece, as well, to additionally advance angularly the required supplemental element to create the desired amount of skew or helix thereof.

On completion of the cutting or hobbing operation, to obtain rapid return to the starting point for gauging purposes to establish proper size, it will be noted both in the case of spur gears, when the lead differential mechanism is locked out of engagement and is inoperative, as well as in the case of the generation of helical gearing, when the lead differential mechanism is employed and is operative, that the relationship between the cutting tool, the hob, and the workpiece created in the initial cut is not lost and is maintained during and after the rapid traversing, by differential L, thereby enabling ready measuring or gauging of the workpiece and a second or more cuts to be taken to bring the workpiece to the required size.

To those skilled in the art, it will be apparent on examination that the classic kinematics of a hobbing machine, such as U.S. Patent No. 2,563,982, theoretically at least, enable the milling of threads, for if lead differential mechanism's case 22 is locked and if lead change gears $G/H/J$ are removed and rendered inoperable, if what now becomes suitable feed gears $A/B/C$ are substituted for what were index gears in the case of hobbing, and if suitable threading lead change $D/E/F$ gears are substituted for what were the feed gears in the case of the use of the machine as a gear hobber, it will be observed that the work spindle and hence the workpiece and thence the lead screw can be made to rotate in the proper timed relationship so that there will transpire the properly timed relative feeding motion between a thread milling cutter, substituted for the normal gear hob, and the workpiece so that threads of the desired lead or pitch can and will be milled.

The same means for rapid traversing back to the starting point of the cut that was employed when the machine was set up as a hobbing machine can also be resorted to if threads are to be milled, for if the case of rapid traverse differential T is now spun at some suitable rate via a separate means, such as a rapid traverse motor in association therewith via suitable gearing means, rapid traverse or quick return of the mechanism to the starting point can and will be achieved. However, it will immediately be apparent that the same problem, employing the conventional hobbing machine as a thread miller as well, occurs when rapid traversing that transpired when a classic thread milling machine was used as gear hobbing machine. The lead relationship, established during the initial cut between, in this instance, the thread milling cutter on the (hobbing) machine and the workpiece, the component being threaded, is lost during rapid return, precluding the possibility of gauging the component and then taking a subsequent cut or cuts to bring the part being threaded to the desired size.

It will be observed that, whereas in the case of the conventional gear hobbing machine, the workpiece and the cutter or hob must be rotated in the precise timed relationship, when the thread milling proces is employed, it is at least extremely desirable to be able to control the rates of rotation of the work spindle and the workpiece, and the thread miller's cutter, spindle, independently of each other. Hence, when an endeavor is made to produce threads via the milling process on the conventional hobbing machine, means are not at hand to vary either the work spindle or the cutter spindle speeds independently.

Finally, another reason that previously estopped the usage of one machine for both gear hobbing and thread milling as well is the fact that apparently work spindle rotation rates for the two processes are so different that unless extremely costly and complex reduction gear boxes are resorted to that the differences of rotation rates are incapable of resolution. In the case of hobbing, for example, work spindle rotation rates are relatively high; if a twenty tooth gear or spline is being generated with a single start hob operating at a speed of 400 r.p.m., the work spindle must be rotated at 20 r.p.m.

On the other hand, if, for example, a 4″ diameter one inch lead worm is being milled using a feed rate of three inches per minute, the thread milling machine must be arranged with suitable feed gearing so that its work spindle will make but one revolution in about four minutes, or that it will operate at a rate of ½–¼ r.p.m. Although it is true that these widely variant rates can be combined, the means to so do are excessively costly and complex, another reason that in the past efforts to combine, in but one meachine, means to hob gears and splines and to mill threads as well, have not succeeded.

My invention solves these problems in an inexpensive, extremely simple manner, enabling the satisfactory combining, in but one machine, of means to hob spur and helical gears or splines, maintain relationship during quick return for gauging and sizing purposes, mill threads or worm sections on the same machine, at the proper work and cutter rotation rates, and maintain lead relationship during quick return for gauging purposes and the taking of a second or more cuts, via a new and novel employment of what is normally the lead differential on a hobbing machine, serving also as a rapid traverse differential mechanism with its own separate rapid traverse drive mechanism for thread milling rapid traverse, in association with a new and novel method of shifting or moving the drive shaft on which there are male splines, into or out of engagement with female splines in driven members to enable selective clutching or declutching thereby without resorting to the usual expense and complexities of conventional positive jaw clutches.

It is an object of my invention to achieve the setting up of the transmission mechanism in a machine tool of the type for hobbing gears, helical gears and splines, whereby said mechanism may readily and easily be converted to operate the machine as a thread miller, and vice versa.

A further object of this invention is a single machine tool mechanism selectively operable to utilize the machine for gear and spline hobbing or for milling threads.

Another object is a single machine tool selectively capable of thread milling and/or hobbing gears and splines by utilizing simple selective means forming a part of the transmission mechanism for establishing a proper timed relationship between the cutter and work spindles without material changes in the common power transmission mechanism, thus eliminating the necessity for time consuming and tedious calculations for such translations of the mechanism and further without destroying the accuracy of the work produced by the machine in either instance.

Another object is to provide a machine of the type disclosed in which is incorporated novel means by which the machine's lead differential mechanism, when hobbing, can be utilized as the machine's rapid traverse differential mechanism when threading and also enables the usage of what is normally the machine's rapid traverse differential mechanism, when hobbing, as a longitudinal positioning device to re-establish the relationship of a thread already cut that has to be recut, to the cutter.

A still further object is to economize in the production of hobbed gears and splines and the like, as well as in the milling of threads by the elimination of separate and independent machines for these respective operations, with the attendant set-up in each instance, while, at the same time insuring accuracy of the finished piece produced by these operations in a single machine.

Another object is to provide means whereby the speeds or rates of rotation of the work spindle and the cutter spindle may be varied or selected independently.

Other objects and advantages of this invention will become more apparent as the following description of an embodiment thereof progresses, reference being made to the accompanying drawing in which like reference characters are employed to designate like parts throughout the same.

In carrying out my invention, I have illustrated a form thereof in the accompanying drawings from which and from the following description, it will readily be seen that the gearing system basically may be utilized in a single machine under certain conditions and with certain gearing arrangements easily effected by the operator, i.e., the selective application of motive power to utilize the lead differential mechanism, when hobbing, as the machine's rapid traverse differential mechanism, when threading, and to employ the machine's normal rapid traverse differential mechanism, when hobbing, as a longitudinal positioning means to re-establish the relationship of a thread already cut, and that has to be recut, to the cutter.

Figure 1:
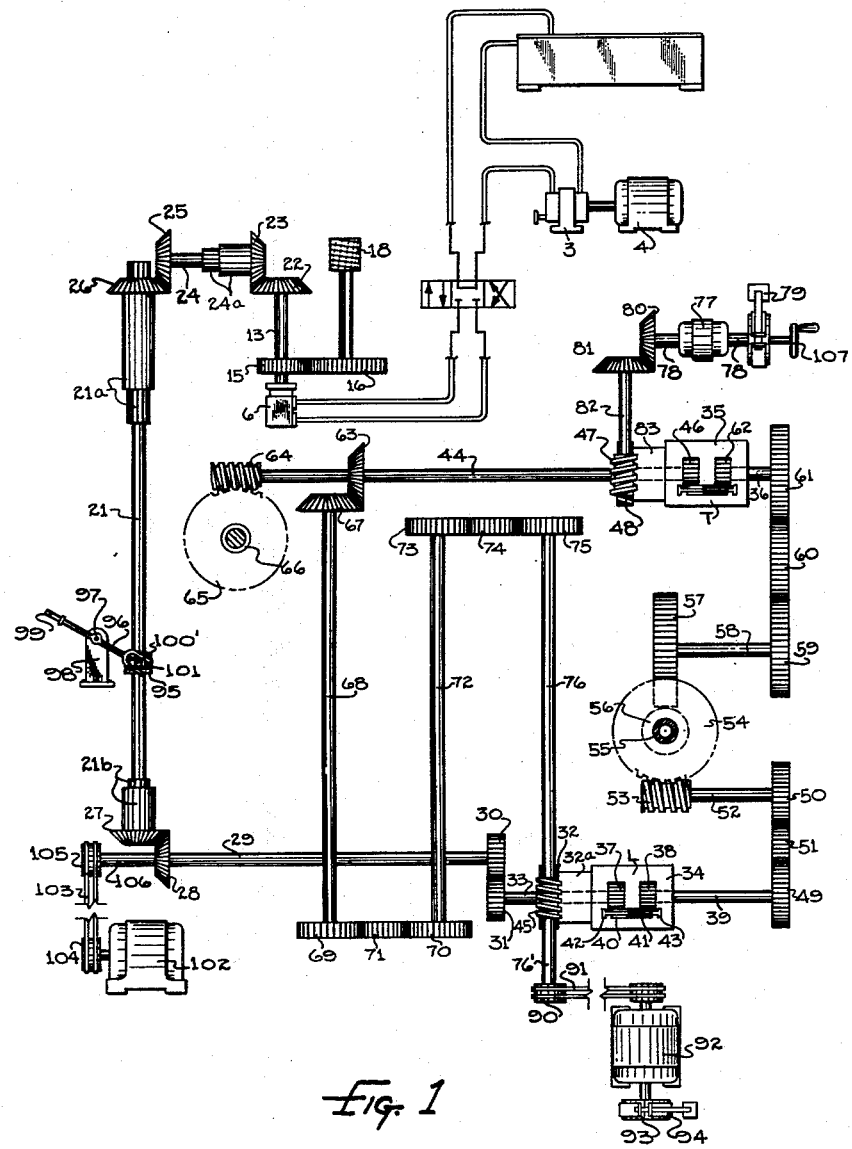
FIGURE 1 is a diagrammatic view of a form of kinematics illustrating how the same may be employed in a single or multiple station gear and spline hobbing machine.

Referring first to FIGURE 1, which illustrates the invention in use for performing a gear or spline hobbing operation on a workpiece as, for instance, is fully disclosed in my copending application entitled: Main Drive Means for a Gear Hobbing Machine, Serial No. 252,656, filed January 21, 1963, the hob 18 is driven by a source of power such as a hydraulic motor 6 through the method gears 15 and 16. The motor 6 has suitable connection with a fluid pressure source as the pump 3 driven by motor 4. It is preferred that the motor 6 be carried directly on the swiveling portion of the hob head of the machine and delivers its power substantially directly to the hob spindle through the gears 15 and 16 and secondarily by means of the shaft 13 through the bevel gears 22 and 23, the sliding spline connection 24$^a$ without disrupting the drive during any swivel action of the hob head, thence through shaft 24, bevel gears 25 and 26 and sliding spline connection 21$^a$ to the main drive shaft or back shaft 21 and through a sliding spline connection 21$^b$ on the lower end of the back shaft to the bevel gear 27. With the parts in the position shown, power from the drive shaft 21 is transmitted through the gears 27, 28 to shaft 29 and through the meshed gears 30–31 to the differential input shaft 33, or the gears 30, 31 may be eliminated and shafts 29 and 33 may be a single shaft.

Figure 3:
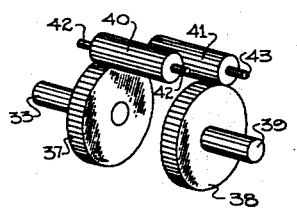
FIGURE 3 is a schematic perspective view of a portion of the differential mechanism shown in FIGURES 1 and 2.

Differential mechanisms, indicated generally at L and T include rotatable frames 34 and 35, respectively, and input shafts 33 and 36, respectively. In FIGURE 3 I have illustrated in diagrammatic form the internal gearing of the differentials L and T, the rotatable cover having been removed in this figure. A gear 37 is secured on input shaft 33 and spaced from and axially aligned with it is a gear 38 on the output shaft 39. Intermeshing differential pinion gears 40 and 41 are also respectively meshed with the gears 37 and 38. Rotatably supported pinion shafts, indicated at 42 and 43, respectively, are supported in the rotatable frame 34.

The mounting of the differential spindles 42 and 43 on the differential frame 34 is relied upon to communicate the increment of speed variation to be imparted to the gear 38 and the output shaft 39 by the effect of rotation of the worm wheel 32 by motion derived from a shaft 44, since the rotational rate of the gear 38 is at a rate which is the algebraic sum of the rotational rate of the input gear 37 plus the rotational rate imparted by the worm 45 to the frame 34.

This action is similar with respect to the acceleration of rate of rotation imparted to the shaft 44 carrying the gear 46 by rotation of the frame 35 of the differential mechanism T by the driving effect of the worm 47 on the gear 48.

A set or group of index gears may be variously arranged, but, as illustrated in FIGURE 1, may comprise a driving index gear 49 secured to the differential output shaft 39 and a driven output gear 50 secured to the shaft 52, there being one or more intermediate index gears 51 interposed between and in serial relation with the gears 49 and 50. To the opposite end of the shaft 52 is secured a worm pinion 53 and the worm wheel 54 is rigidly fixed to the work spindle 55 whereby the latter is rotated at a precise or exact rotational rate by the worm pinion 53. A helical gear 56 affixed to the work spindle drives a relatively mating helical gear 57 fixed to the shaft 58 when the spindle is rotated. Fixed to the opposite end of the shaft 58 is a driving feed gear 59 which is in mesh with one or more intermediate gears 60 for transmitting driving motion to the output feed gear 61 carried on the outer end of shaft 36. The shaft 36 carries on its inner end, which is disposed within the rapid traverse differential casing 35, a driving gear 62. The rotatable frame 35 of the rapid traverse differential is secured to a worm gear 48 which, during cutting feed movements of the hob, is maintained non-rotatable, as will be described hereinafter.

Rotary motion is communicated from the input gear 62 to the driven gear 46 fixed on the inner end of shaft 44 within the differential frame, through one or more pairs of differential pinions, as described in connection with differential L and substantially as shown in FIGURE 3.

A bevel gear 63 and a worm pinion 64 are fixed on shaft 44 in longitudinally spaced relation and rotational movement imparted to the shaft 44 and communicated to the worm pinion 64 causes this pinion to drive the worm gear 65 which is rigidly fixed to the lower end of the lead screw 66, whereby rotary movement is given to vertically move the hob carriage to cause the required feed movement of the hob spindle while moving transversely across the periphery of a work blank placed on the work spindle 55, and in a direction parallel to the axis of the work spindle.

Rotational movement imparted to the shaft 44 will, through the meshing bevel gears 63 and 67, drive the lead gear 69 affixed to the opposite end of the shaft 68. A second lead gear 70 is carried on the adjacent end of the shaft 72 and is driven by means of an intermediate gear 71 in mesh with the gears 69 and 70, and as a result of rotational movement of the shaft 68. Rotational movement of the lead gear 70 is transmitted through the shaft 72 and through a set of relatively intermeshed gears 73, 74 and 75, gear 73 being fixed to the upper end of shaft 72 and gear 75 being fixed to the upper end of shaft 76. To the oppoiste end of shaft 76 is fixed the worm 45 which is intermeshed with the worm wheel 32 fixed to the hub 32ᵃ of the rotatable lead differential frame 34.

At 77 I have illustrated a rapid traverse motor which has a double ended shaft 78 to which at one end a brake drum 79 is affixed and disposed in operative relation to brake shoe devices of a well known type with automatic means adapted to retract the brake shoes to release the brake concurrently with the starting of the motor 77. To the other end of the shaft 78 is fixed a bevel gear 80 which, being meshed with a bevel gear 81 fixed to shaft 82, will drive the worm wheel 48 through the worm pinion 47 fixed to the shaft 82 and which is in mesh with the worm wheel 48, the worm wheel 48 being carried by the hub 83 fixed to the rotatable frame 35 of the rapid traverse differential mechanism T.

The rapid traverse mechanism is, during hob cutting operations, inoperative, and therefore the brake comprising the drums and shoes maintain the differential frame 35 non-rotatable by the locking effect of the worm gearing 47, 48.

Whenever, during the operation of the machine as a hobbing machine, in accordance with the arrangement shown in FIGURE 1, the rapid traverse mechanism is operative, it is adapted to speed up the rotatable rate of the shaft 44 and thereby the lead screw 66 by the driving effect of the relatively rapid rotating worm 47 on the worm gear 48, whereby to effect added rotational speed, regardless of any concurrent rotary movement imparted to the differential gear 62 by the feed gear 61.

Figure 2:
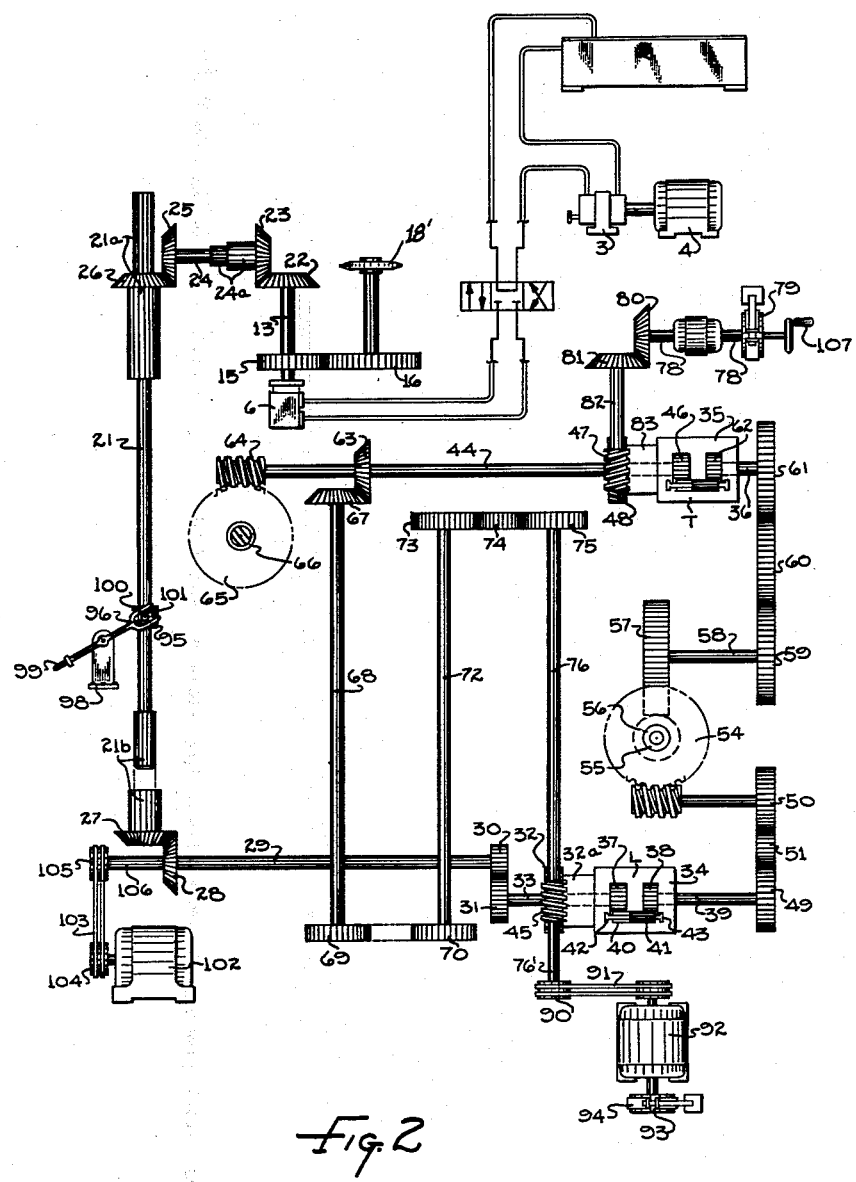
FIGURE 2 is a view similar to that of FIGURE 1 and illustrates how the structure of FIGURE 1 may be utilized for thread milling.

In FIGURE 2, I have illustrated substantially the same gearing and drive layout as that shown in FIGURE 1 and described above and have, in addition, illustrated means by which this mechanism and layout may readily and quickly be converted into a machine for milling threads without substantial change in the arrangement to thereby accomplish the full utility of the machine for both hobbing and thread milling operations. The necessity for additional floor space and additional expensive separate machines in order to carry out these separate operations is also eliminated.

According to the present invention, when a hobbing machine such as that disclosed in Patent No. 2,563,982, equipped with a lead differential mechanism shown at L in the present disclosure, is to be employed as a thread milling machine, the lead differential drive shaft 76 is extended as at 76′ and this extension carries a driven sheave 90 keyed thereto and suitably connected by V belts 91 to a threading rapid traverse drive motor 92 which, in turn, is operatively connected to threading rapid traverse motor brake 93 so arranged in the normal threading operation that, when the motor is energized, the brake's solenoid (not shown) is also engaged releasing the brake shoes 94 and loosening the brake; de-energizing the motor also de-energizes the brake's solenoid to set the brake and to thereby quickly and accurately stop the rapid traverse. When thread milling, the idler gear 71 is, of course, disengaged from the hobbing machine's lead gear train, disconnecting and permitting the shaft 68 to run freely.

As shown and described hereinbefore, when the machine is operating as a hobbing machine, power to drive the hob 18 and the work spindle 55 carrying a blank or workpiece (not shown), causing them to rotate in proper timed relationship, is transmitted from a fixed or variable speed power source, such as the hydraulic motor 6, directly to the hob head and hob and to the drive or back shaft 21 simultaneously, through the permanently splined coupling 21ᵃ and through the engaged splined coupling members 21ᵇ, drive bevel gears 27 and 28, shaft 29, gears 30 and 31, shaft 33, lead differential L and through the gear train 49, 51, 50, 52, 53 and 54 to the work head 55.

It will be observed that the back shaft is, in addition to its rotative movement and by virtue of the permanent sliding spline coupling at 21ᵃ and the slidingly separable spline coupling at 21ᵇ, also capable of axial movement to axially engage and disengage the telescoping male and female spline members 21ᵇ carried on the shaft 21 and bevel gear 27, respectively. In order to axially shift this shaft 21 into and out of driving connection with the power sources 6 and 102, respectively, any suitable means may be provided. When the shaft 21 is in the position shown in FIGURE 1 (for hobbing), the spline members 21ᵃ are engaged as are the spline members 21ᵇ, but when shaft 21 is shifted axially upwardly as in FIGURE 2 (for thread milling), the driving connection through the spline member 21ᵇ is broken by disengaging these members. One form of such shift means is shown diagrammatically as including a grooved collar 95 fixed on the shaft 21 to rotate therewith, a shift lever 96 fulcrumed at 97 to a supporting base 98 and having an operating handle or arm 99 at one end while its opposite end is forked as at 100 and pivotally and slidably engaged with a pair of pins 100′ radially carried on the idler ring 101 operating in the groove of the collar 95.

In the position of the lever 96 as shown in FIGURE 1, the splined connection between the shaft 21 and the bevel gear 27 will be engaged. When the shaft 21 is disengaged from the bevel gear by shifting the shaft 21 axially to disengage the spline members 21ᵇ, supplemental power means such as a drive motor 102 is provided to directly drive shaft 29 through the belts 103 and sheaves 104 and 105, the latter being keyed to the extended end 106 of the drive shaft 29. This arrangement permits rotation of the work head of the machine at the relatively lower rates of work spindle rotation for thread milling purposes.

Under these conditions, the variable speed drive source 6 can be employed to vary, at will, the cutter spindle speeds when threading without effecting work spindle rotation speeds when threading, since the power sources 6 and 102 are separate and independently controlled for powering the work head for feed.

It will be observed now that what had served as index gears 49, 50 and 51, when hobbing, become the gears that control work spindle rotation rates when threading, that is, the threading feed gears. Likewise, gears 59, 60 and 61, which had served as feed gears when hobbing, now become, through the choice of proper ratios, the machine's feed gears, when threading. For instance, if the ratio of the gear 56 to the gear 57 is a ratio of three to two and the ratio of the worm and wheel 64 and 65, respectively, is two to fifteen, and the pitch or lead of the lead screw 66 is, in this instance, a lead of one-half inch, the overall lead ratio becomes 3:2 x ½ or 1:10. It will be seen that this produces a very satisfactory and easy calculation for threading since the (threading) lead gears now become merely the lead to be milled times ten.

Thus, when the well known kinematics of the hobbing machine are regrouped, according to this invention and by the means disclosed herein, it will be understood that the required low rate of work head rotation for feed, when threading, is now most satisfactorily obtained by disengaging the back shaft drive from the gear 28 through the spline 21$^b$, operatively connecting the work head drive motor 102, and that for threading rapid, by selectively operating threading rapid motor 92, and rapidly rotating differential frame or case 34, the work head can be spun at a desired higher rate essential for rapid traverse—at the same time maintaining the required relationship between a threading cutter and work piece established during a first trial cut for subsequent gauging or measuring and thereafter additional cuts to bring the piece being threaded, to the desired size. Thus the lead differential generally shown at L, when hobbing, can be employed as the same machine's rapid traverse differential when threading, enabling the maintenance of threading relationship between the cutter and the piece during and after rapid traverse. When threading, the differential T (rapid traverse differential in hobbing) is not used in that operation of the machine. However, a piece once threaded and then removed from the machine and which may have to be re-cut for any reason, the differential T can now carry out a new and extremely vital function when the machine is being employed as a thread miller. Ordinarily, to pick up accurately a section of a piece that has been threaded with a threading cutter is an extremely laborious and time consuming operation, but by my invention, I utilize the hobbing machine kinematics in a novel manner whereby the hobbing machine's lead differential mechanism in hobbing becomes the machine's rapid traverse differential mechanism, when threading, and further enables the use of the machine's rapid traverse differential mechanism T, when hobbing, as a longitudinal positioning means to re-establish the proper relationship between a thread already cut, and that has to be re-cut, and the cutter.

Shaft 78 is extended to terminate in a hand wheel 107, which is utilized to rotate the shaft and, through gears 80 and 81, to rotate the worm 47 causing worm wheel 48 affixed to the differential frame or case 35 to turn, thus locking the gears 59, 60 and 61 from turning due to the locking action of worm 53 and worm wheel 54. Under these conditions, rotation of the differential case 35 will cause the output drive shaft 44 and lead screw 66 to turn whereby exact manual positioning of the cutter 18 with relation to a part that has been threaded, removed from the machine, and that has to be re-established in the machine for re-threading, can be easily and quickly carried out accurately, enabling the lining up or matching of the cutter to the already threaded section.

The selective conversion and operation of the machine as a hobbing machine or as a thread milling machine is easily and quickly accomplished.

The machine, in hobbing, as illustrated diagrammatically in FIGURE 1, is powered by the hydraulic motor 6, while the motors 102 and 92 which drive the shafts 29 and 76, respectively, are inactivated by disconnecting the drive belts 103 and 91 from the respective motor sheaves, thus furnishing power directly to the hob 18 and through the permanently splined connection 21$^a$ to the drive or back shaft 21, and through the engaged spline members 21$^b$ and gears 27 and 28 to the shaft 29 to drive the lead differential, indexing and feed gears, the work spindle, the rapid traverse differential and lead screw, rapid traverse being effected by operation of the motor brake 79.

In FIGURE 2, the same machine is illustrated as converted for use as a thread miller simply by replacing the hob 18 with a milling cutter 18' and disengaging the back shaft spline members 21$^b$ which is accomplished by axially sliding the back shaft upwardly on the permanent spline 21$^a$ through movement of the lever and handle about its fulcrum 96, from the position shown in FIGURE 1 to the position shown in FIGURE 2, sufficiently to effect disengagement of the spline member 21$^b$. A direct drive to the shaft 29 is effected from the motor 102 by assembling the belts on the sheaves 104 and 105. It is also necessary to disengage either gear 71 or gear 74 by any suitable means from the respective gear trains 69, 70, 71 or 73, 74, 75 and to establish a direct drive to the shaft 76' and worm 45 from the motor 92 by replacing the belts 91 on the sheaves 90. The hand wheel 107 is employed, as explained above, to rotate the shaft 78 causing worm wheel 48 to turn and effect a lock in one direction between the worm 47 and the worm wheel 48 causing output drive shaft 44 and lead screw 66 to turn to exactly and manually position the cutter with relation to a threaded part re-established in the machine for re-threading.

From the foregoing, it will be seen that by effecting a few simple modifications in the well known general kinematics of a hobbing machine, such a machine can readily and easily be converted to a threaded miller, or vice versa, thus conserving floor space, but more important, affording dual precision operations in a single basic machine. While such results have long been desired and sought after by those skilled in the art, they have not been accomplished heretofore to my knowledge. Furthermore, I have produced the desired result by employing a unique and relatively simple conversion means enabling a single machine to function selectively for performing a hobbing operation on a piece or for performing a thread milling operation while retaining the full characteristics of the selected operation.

I claim:

1. A machine tool selectively convertible for use as a hobbing machine and for thread milling comprising a tool spindle for receiving a selected cutter thereon, a main drive shaft, a single drive means for the spindle and drive shaft, a rotatable housing lead differential mechanism, a first index gear train, a work spindle, a rotatable housing traverse differential mechanism, a lead screw, said lead drive shaft having a releasable drive connection with the input to said lead differential, a second index gear train driven by said single drive and having a drive input to the traverse differential, said first index gear train delivering the output of said lead differential to the work spindle to rotate the same at a precise rotational rate, said second gear train determining the cutting gear rate of a tool on the tool shaft, means for disengaging the drive shaft drive to the work spindle, a selectively open and closed gear train having driving connection only, when closed, with said lead screw and with the rotational housing of the lead differential mechanism, a prime mover energizable for effecting a precise rotational rate to the work spindle through said lead differential and independent from said drive shaft when the releasable drive connection of the drive shaft is disengaged, and a second prime mover energizable for effecting a driving connection with the rotational housing of the lead differential when the selectively open and closed gear train is open, whereby respectively the selected relationship of the rotational rate of the work spindle to the tool feed rate is maintained constant during dis-engagement of the first and second prime movers while maintaining a driving connection between the drive shaft and the lead differential and during maintenance of a closed drive of the gear train connecting the rotatable housing of the lead differential with the lead screw as in performing a hobbing operation, and whereby the selected relationship between the rotational rate of the work spindle to the tool feed rate may be maintained as in thread milling.

2. A machine tool selectively convertible for use as a hobbing machine and for thread milling comprising a tool spindle for receiving a selected cutter thereon, a main drive shaft, a single drive means for the spindle and drive shaft, a rotatable housing lead differential mechanism, a first index gear train, a work spindle, a rotatable housing traverse differential mechanism, a lead screw, said drive shaft having a releasable drive connection with the input to said lead differential, a second index gear train driven by said single drive and having a drive input to the traverse differential, said first index gear train delivering the output of said lead differential to the work spindle to rotate the same at a precise rotational rate, said second gear train determining the cutting gear rate of a tool on the tool shaft, means for disengaging the drive shaft drive to the work spindle, a selectively open and closed gear train having driving connection only, when closed, with said lead screw and with the rotational housing of the lead differential mechanism, a prime mover energizable for effecting a precise rotational rate to the work spindle through said lead differential and independent from said drive shaft when the releasable drive connection of the drive shaft is disengaged, and a second prime mover energizable for effecting a driving connection with the rotational housing of the lead differential when the drive shaft connection with the input to the lead differential and with said selective gear train to the lead screw are both open, whereby respectively the selected relationship of the rotational rate of the work spindle to the tool feed rate is maintained constant during dis-engagement of the first and scond prime movers while maintaining a driving connection between the drive shaft and the lead differential and during maintenance of a closed drive of the gear train connecting the rotatable housing of the lead differential with the lead screw as in performing a hobbing operation, and whereby the selected relationship between the rotational rate of the work spindle to the tool feed rate may be maintained as in thread milling.

3. A machine tool selectively convertible for use as a hobbing machine and for thread milling comprising a tool spindle for receiving a selected cutter thereon, a back shaft, a single drive means for the spindle and back shaft, a rotatable housing lead differential mechanism, a first index gear train, a work spindle, a rotatable housing traverse differential mechanism, a lead screw, said back shaft having at one end a splined connection with said single drive means and at its opposite end with the input to said lead differential, and means for axially moving said back shaft into and out of driving connection with said lead differential input, a second index gear train driven by said single drive and having a drive input to the traverse differential, said first index gear train delivering the output of said lead differential to the work spindle to rotate the same at a precise rotational rate, said second gear train determining the cutting gear rate of a tool on the tool shaft, means for disengaging the back shaft drive to the work spindle, a selectively open and closed gear train having driving connection only, when closed, with said lead screw and with the rotational housing of the lead differential mechanism, a prime mover energizable for effecting a precise rotational rate to the work spindle through said lead differential and independent from said back shaft when the releasable drive connection of the back shaft is disengaged, and a second prime mover energizable for effecting a driving connection with the rotational housing of the lead differential when the selectively open and closed gear train is open, whereby respectively the selected relationship of the rotational rate of the work spindle to the tool feed rate is maintained constant during dis-engagement of the first and second prime movers while maintaining a driving connection between the back shaft and the lead differential and during maintenance of a closed drive of the gear train connecting the rotatable housing of the lead differential with the lead screw as in performing a hobbing operation, and whereby the selected relationship between the rotational rate of the work spindle to the tool feed rate may be maintained as in thread milling.

4. A machine tool selectively convertible for use as a hobbing machine and for thread milling comprising a tool spindle for receiving a selected cutter thereon, a back shaft, a single drive means for the spindle and back shaft, a rotatable housing lead differential mechanism, a first index gear train, a work spindle, a rotatable housing traverse differential mechanism, a lead screw, said back shaft having at one end a splined connection with said single drive means and at its opposite end with the input to said lead differential, and means for axially moving said back shaft into and out of driving connection with said lead differential input, said back shaft axial moving means including a member fixed to said back shaft for rotation therewith and a second member carried by and engageable with the first member and operable to impart axial movement to the rotatable back shaft to engage and disengage the back shaft drive connection with the lead differential input, a second index gear train driven by said single drive and having a drive input to the traverse differential, said first index gear train delivering the output of said lead differential to the work spindle to rotate the same at a precise rotational rate, said second gear train determining the cutting gear rate of a tool on the tool shaft, means for disengaging the back shaft drive to the work spindle, a selectively open and closed gear train having driving connection only, when closed, with said lead screw and with the rotational housing of the lead differential mechanism, a prime mover energizable for effecting a precise rotational rate to the work spindle through said lead differential and independent from said back shaft when the releasable drive connection of the back shaft is disengaged, and a second prime mover energizable for effecting a driving connection with the rotational housing of the lead differential when the selectively open and closed gear train is open, whereby respectively the selected relationship of the rotational rate of the work spindle to the tool feed rate is maintained constant during dis-engagement of the first and second prime movers while maintaining a driving connection between the back shaft and the lead differential and during maintenance of a colsed drive of the gear train connecting the rotatable housing of the lead differential with the lead screw as in performing a hobbing operation, and whereby the selected relationship between the rotational rate of the work spindle to the tool feed rate may be maintained as in thread milling.

References Cited by the Examiner
UNITED STATES PATENTS
2,856,834   10/58   Berthiez _____ 90—4

WILLIAM W. DYER, JR., *Primary Examiner.*